US009557733B2

(12) United States Patent
Zanichelli et al.

(10) Patent No.: US 9,557,733 B2
(45) Date of Patent: Jan. 31, 2017

(54) PACKAGING SYSTEM WITH MARKING SYSTEM INCLUDING A MARKING SERVER TO STORE TEMPLATES

(75) Inventors: Paolo Zanichelli, Modena (IT); Filippo Serafini, Campogalliano (IT); Claudio Donati, Modena (IT); Lorenzo Tacconi, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 559 days.

(21) Appl. No.: 13/824,702

(22) PCT Filed: Oct. 20, 2011

(86) PCT No.: PCT/EP2011/068382
§ 371 (c)(1),
(2), (4) Date: Mar. 18, 2013

(87) PCT Pub. No.: WO2012/052529
PCT Pub. Date: Apr. 26, 2012

(65) Prior Publication Data
US 2013/0178969 A1 Jul. 11, 2013

(30) Foreign Application Priority Data

Oct. 20, 2010 (EP) .................................... 10188216

(51) Int. Cl.
*G05B 19/418* (2006.01)
*B65B 61/26* (2006.01)

(52) U.S. Cl.
CPC ............. *G05B 19/418* (2013.01); *B65B 61/26* (2013.01); *G05B 19/4185* (2013.01);
(Continued)

(58) Field of Classification Search
None
See application file for complete search history.

(56) References Cited

U.S. PATENT DOCUMENTS 6,732,928 B1 5/2004 Lawlor
8,555,206 B2 10/2013 Pederson et al.
(Continued)

FOREIGN PATENT DOCUMENTS

EP 1098265 A2 5/2001
EP 1106513 A1 6/2001
(Continued)

OTHER PUBLICATIONS

International Search Report (PCT/ISA/210) issued on Dec. 19, 2011, by the European Patent Office as the International Searching Authority for International Application No. PCT/EP2011/068382.
(Continued)

*Primary Examiner* — Mohammad Ali
*Assistant Examiner* — Bernard G Lindsay
(74) *Attorney, Agent, or Firm* — Buchanan Ingersoll & Rooney PC

(57) ABSTRACT

A Packaging System having a Packaging Line designed to produce Packaged Consumer Products; a Marking System designed to mark individual or packs of Packaged Consumer Products with graphical information, and a Line Controller designed to control the Packaging Line and the Marking System. The Marking System includes: Marking Equipment and a Marking Server. The Marking Server is designed to receive Production Batch Data and associated Template Identifier(s); and a Marking Device Controller. The Line Controller is designed to: receive Production Batch Data and generate Marking Instruction(s) for associated Marking Device Controller(s). The Marking Device Controller is designed to: receive Marking Instruction(s) from the Line Controller, fetch out from a Repository in the Marking Server stored Mark Layout Template(s) and Production Batch Data, and generate Marking Command(s) for Marking Device(s) controlled by the Marking Device Controller
(Continued)

based on fetched Mark Layout Template(s) and Production Batch Data.

14 Claims, 2 Drawing Sheets

(52) U.S. Cl.
CPC ... *G05B 19/4188* (2013.01); *G05B 19/41865* (2013.01); *G05B 2219/31344* (2013.01); *G05B 2219/31372* (2013.01); *G05B 2219/32025* (2013.01); *G05B 2219/45048* (2013.01); *Y02P 90/12* (2015.11); *Y02P 90/18* (2015.11); *Y02P 90/20* (2015.11); *Y02P 90/24* (2015.11); *Y02P 90/265* (2015.11)

(56) References Cited

U.S. PATENT DOCUMENTS

| | | |
|---|---|---|
| 2001/0005968 A1 | 7/2001 | Mills |
| 2003/0176942 A1* | 9/2003 | Sleep et al. .............. 700/213 |
| 2008/0103622 A1 | 5/2008 | Hanses et al. |
| 2009/0076633 A1 | 3/2009 | Sullivan et al. |
| 2009/0164933 A1 | 6/2009 | Pederson et al. |
| 2010/0287879 A1 | 11/2010 | Donati et al. |

FOREIGN PATENT DOCUMENTS

| | | |
|---|---|---|
| EP | 2 075 658 A1 | 7/2009 |
| JP | 2009-151787 A | 7/2009 |
| WO | WO 2009/083594 A1 | 7/2009 |
| WO | WO 2009/083595 A1 | 7/2009 |
| WO | WO 2009/083597 A1 | 7/2009 |
| WO | WO 2009/083598 A1 | 7/2009 |

OTHER PUBLICATIONS

International Preliminary Report on Patentability (PCT/IPEA/409) issued on Jan. 22, 2013, by the European Patent Office as the International Examining Authority for International Application No. PCT/EP2011/068382.

* cited by examiner

PACKAGING SYSTEM WITH MARKING SYSTEM INCLUDING A MARKING SERVER TO STORE TEMPLATES

TECHNICAL FIELD OF THE INVENTION

The present invention relates in general to packaging of consumer products, and in particular to marking of Packaged Consumer Products, specifically perishable products such as pourable food products, to which the following description specifically refers purely by way of example.

BACKGROUND ART

As is known, on a factory floor of a food packaging plant, several specifically-aimed processes are generally performed, including incoming food and packaging material storage, food processing, food packaging, and package warehousing. With specific reference to pourable food products, food packaging is performed in Packaging Lines, each of which is an assembly of machines and equipments for the production and handling of packages, and includes a Filling Machine for the production of the packages, followed by one or more defined configurations of downstream Distribution Equipments such as, accumulators, straw applicators, film wrappers, and cardboard packers, connected to the Filling Machine via Conveyors, for the handling of the packages.

A typical example of this type of packages is the parallelepiped-shaped package for liquid or pourable food products known as Tetra Brik Aseptic®, which is made by folding and sealing a laminated web of packaging material.

The packaging material has a multilayer sheet structure substantially comprising one or more stiffening and strengthening base layers typically made of a fibrous material, e.g. paper, or mineral-filled polypropylene material, covered on both sides with a number of heat-seal plastic material layers, e.g. polyethylene film. In the case of aseptic packages for long-storage products, such as UHT milk, the packaging material also comprises a gas- and light-barrier material layer, e.g. aluminium foil or ethyl vinyl alcohol (EVOH) film, which is superimposed on a heat-seal plastic material layer, and is in turn covered with another heat-seal plastic material layer forming the inner face of the package eventually contacting the food product.

Packages of this sort are produced on fully automatic Filling Machines, wherein a continuous vertical tube is formed from the web-fed packaging material; which is sterilized by applying a chemical sterilizing agent such as a hydrogen peroxide solution, which, once sterilization is completed, is removed, e.g. evaporated by heating, from the surfaces of the packaging material; and the sterilized web is maintained in a closed, sterile environment, and is folded and sealed longitudinally to form the vertical tube. The tube is then filled downwards with the sterilized or sterile-processed pourable food product, and is fed along a vertical path to a forming station, where it is gripped along equally spaced cross sections by two pairs of jaws, which act cyclically and successively on the tube, and seal the packaging material of tube to form a continuous strip of pillow packs connected to one another by transverse sealing strips. Pillow packs are separated from one another by cutting the relative sealing strips, and are conveyed to a final folding station where they are folded mechanically into the finished, e.g. substantially parallelepiped-shaped, packages.

Alternatively, the packaging material may be cut into blanks, which are formed into packages on forming spindles, and the packages are filled with food product and sealed.

One example of this type of package is the so-called "gable-top" package known as Tetra Rex®.

Previous-generation Packaging Lines generally have a decentralized control, poor or even no configuration flexibility, and different communication channels and automation solutions and hardware, and generally require customization of the line automation software in the Filling Machine and each Distribution Equipment.

Therefore, the automation and control systems for the previous-generation Packaging Lines could not provide the flexibility and functionality features required to satisfy the ever-increasing market demand for food safety and traceability, and for higher production versatility. However, despite their age, many legacy automation and control systems continue to provide valuable functionality that warrants their upgrade, and hence represent a huge capital investment that production management wants to prolong.

In view of that, an ever-increasing need was hence felt for a packaging plant automation evolution, in particular for new generation Packaging Lines featuring integrated solutions such as centralized and robust automation control, increased configuration flexibility, same communication channels and automation solutions and hardware, and no need for customization of the line automation software in the Filling Machines and Distribution Equipments.

WO 2009/083594, WO 2009/083595, WO 2009/083597 and WO 2009/083598, in the name of the Applicant and the contents of which are incorporated herein by reference, disclose a new generation Packaging System which allows the aforementioned need to be met and which includes:

a Packaging Line comprising a Filling Machine and one or more downstream Distribution Equipments connected via Conveyors; the Filling Machine being operable to produce sealed packages containing food product, and each Distribution Equipment being operable to carry out a corresponding operation on individual or groups of sealed packages; the Filling Machine and each Distribution Equipment including an electronic control system designed to store and execute one or more software modules;

a Line Controller programmed to manage configuration, communication and control of the Packaging Line, the Line Controller including a display, a keyboard, and a processing system designed to store and execute software applications configured to cooperate with the software modules in the Filling Machine and Distribution Equipments;

an overhead Message Display designed to provide basic visual information on the operation of the Filling Machine and the Distribution Equipments; and a Communication Network designed to connect the Line Controller to the Filling Machine, the Distribution Equipments, and the Message Display;

wherein the software applications in the Line Controller include:

a Line Configurator, which is a supportive "plug and play" tool designed to reduce and secure effective Packaging Line installation, start up and tuning at the manufacturing floor;

a Line Commander, which is a master controller tool designed to optimize Packaging Line performance and product flows during production;

a Recipe Manager, which is a management tool designed to accommodate production flexibility by improving "easy to use" Packaging Line resources and material; and a Conveyor Optimizer, which is a tool designed to optimize product transportation along the Conveyors.

Packaging Lines are also provided with a Marking System designed to mark individual or packs of Packaged Consumer Products with graphical information, such as production and best-before dates, (bar)codes, etc.

Known Marking Equipments for Packaging Lines are for examples disclosed in EP 1 098 265, EP 1 106 513 and US 2009/076633.

OBJECT AND SUMMARY OF THE INVENTION

The Applicant has noted that the Marking Equipments presently available on the market cannot provide the flexibility and functionality features required to satisfy the ever-increasing market demand for higher food traceability and marking versatility.

The objective of present invention is hence to provide a marking solution which allows this market demand to be met.

This objective is achieved by the present invention in that it relates to a Packaging System, as defined in the appended claims.

DETAILED DESCRIPTION OF PREFERRED EMBODIMENTS OF THE INVENTION

The following description is provided to enable a person skilled in the art to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended claims.

Figure 1:
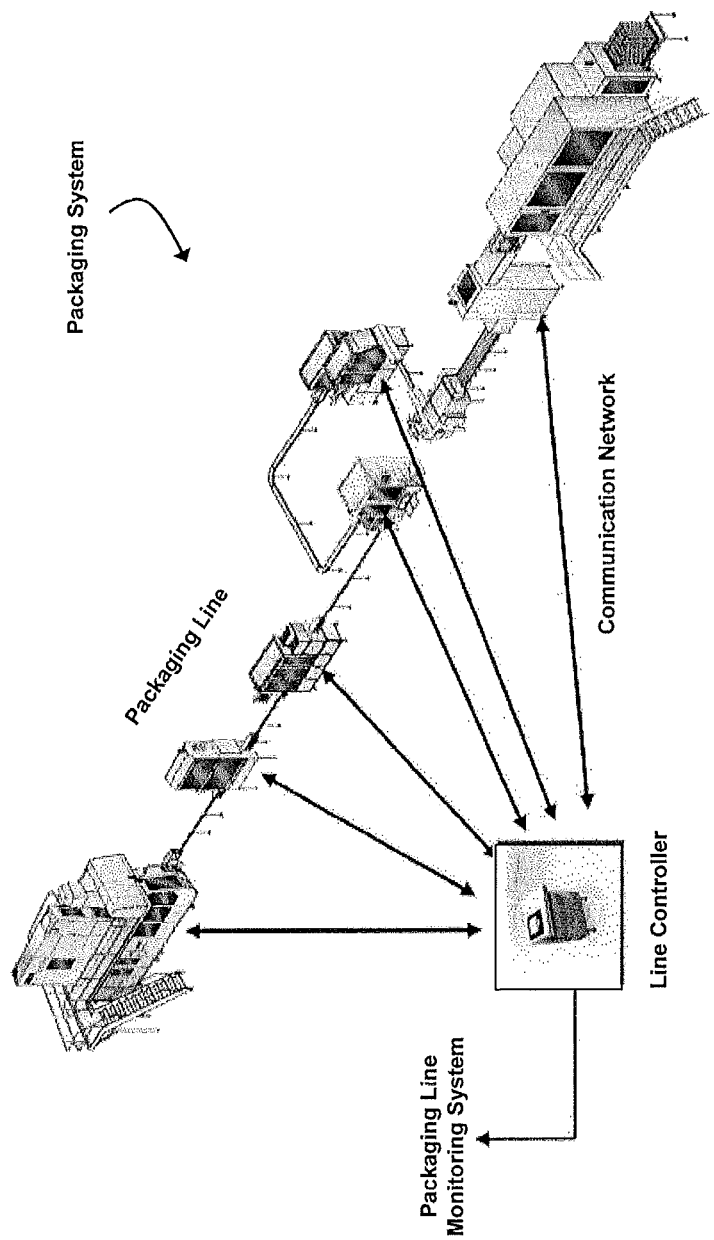
FIG. 1 shows a schematic layout of an integrated Packaging System.

FIG. 1 shows a schematic layout of an integrated Packaging System in a Packaging Plant. The Packaging System is of the type described in the above-identified patent application publications and includes one or more Packaging Lines, only one of which is shown in FIG. 1, and which are automatically configurable to produce Packaged Consumer Products.

A Packaging Line includes:

a Filling Machine or Equipment followed by one or more downstream Distribution Equipments such as, Accumulators, Straw Applicators, Cap Applicators, Handle Applicators, Cardboard Packers, Film Wrappers, Configuration Switches, Dynamic Switches, and Pallet Systems, which are cascade connected to each other and to the Filling Machine (FM) via Conveyors (C), which are all known per se and hence will not be described in detail. In particular, the Filling Machine is operable to selectively produce one or different types of sealed packages, which contain one or different food products introduced in the sealed packages by pouring, and which are made of a multilayer sheet (laminated) packaging material including at least one stiffening and strengthening base layer and one or more heat-seal plastic layers, and each Distribution Equipment is operable to carry out a corresponding packaging operation on incoming individual or packs of sealed packages;

a Line Controller designed to manage configuration, communication and control of the Packaging Line with the aim of optimizing the interaction between the Filling Machine and the Distribution Equipments to improve the Packaging Line performance and product transportation during production;

an Overhead Message Display (not shown in FIG. 1) designed to provide a basic visual information on the operation of the Filling Machine and Distribution Equipments, such as production information, equipment stop, material request, line phase, etc.; and a Communication Network comprising a switch-based Ethernet Network with e.g. a star-topology, and designed to connect the Line Controller to the Filling Machine, the Distribution Equipments, and the Message Display; a Fieldbus, e.g. DeviceNet, network designed to connect the Line Controller to the Conveyors, a digital I/O designed to connect the Line Controller to a Conveyor Lubricating Unit; and a safety bus designed to provide a safety serial communication between zone-based safety PLCs in the Line Controller, the Filling Machine, the Distribution Equipments, and the Conveyors, to allow an easier fulfilment of the legal requirements in Integrated Manufacturing Systems (e.g.: ISO 11161, Packaging line CE marking at customer site).

The Packaging System may be of the Single-Line type, namely including only one Packaging Line, of the Multi-Line type, namely including a plurality of operatively stand-alone Packaging Lines, i.e., Packaging Lines which do not share Distribution Equipments, each provided with an associated Line Controller, or of the Multi-Switch type, namely with a plurality of operatively cooperating Packaging Lines, i.e., Packaging Lines arranged to share one or more Distribution Equipments, so increasing the flexibility and the production variability for the customer. In a Multi-Switch Packaging System, either a single-tier or a two-tier control architecture may be provided. In a single-tier control architecture, only a single, common Line Controller is provided, which is programmed to manage configuration, communication and control of all the Packaging Lines with the aim of optimizing the interaction between the Filling Machines and the Distribution Equipments to improve the Multi-Switch Packaging System performance and product transportation during production, while in a two-tier control architecture, both a slave Line Controller for each Packaging Line and a master Line Controller for the slave Line Controllers are provided.

A Line Controller includes a stand-alone console or cabinet equipped with a Human-Machine Interface made up of a display panel and a keyboard, and a PLC-based control system designed to store and execute modular-architecture software applications or tools configured to cooperate with the local software modules in the Filling Machine and the Distribution Equipments via a standard communication to control and supervise operation of the associated Packaging Line.

The modular-architecture software and the standard interface allow different Packaging Line complexities (different layout and variety of Filling Machines and Distribution Equipments) to be managed without any customization in the software of the single equipment. Compared to the previous generation of Packaging Lines, this allows a standard software in the Filling Machines and Distribution Equipments to be maintained and all the customized parameters to be collected in the Line Controller. The advantage of that is a high level of standardization in the Filling Machines and Distribution Equipments and hence an easy maintenance of them. For the purpose of the present invention, by the expression "software applications" it is intended a defined subclass of computer software that employs the capabilities of a computer directly to a task that the user wishes to perform.

The software applications in a Line Controller include:
a Line Configurator, which is a supportive "plug and play" tool designed to reduce and secure effective Packaging Line installation, start up and tuning at the manufacturing floor;
a Line Commander, which is a master controller tool designed to optimize Packaging Line performance and product flows during production;
a Recipe Manager, which is a management tool designed to accommodate production flexibility by improving "easy to use" Packaging Line resources and material; and
a Conveyor Optimizer, which is a tool designed to optimize product transportation along the Conveyors.

In particular, the Line Configurator is a software application designed to provide a Graphical User Interface which allows four different configuration functionality to be selected/implemented by an operator or specialized technician, namely Machine Detection, Layout Configuration, Layout Association, and Line Settings. All these functionalities enable a "plug and play" mechanism and a flexible parameterization of the Packaging Line during the start-up phase with the reduction of the configuration and tuning time.

The Line Commander is a software application designed to optimize the Packaging Line performance and to control the package transportation. This functionality is important to avoid damages to the packages, in particular to prevent individual or packs of sealed packages from crashing due to long queues at the inlets of the Distribution Equipments or high package flow rate with respect to the capacity of the Packaging Line, and to guarantee the aseptic integrity. In particular, the start/stop policy defines the start/stop sequence and delays of the Filling Machine and the Distribution Equipments after a start/stop of any of the Filling Machine and the Distribution Equipments in the Packaging Line, so as to prevent package queues from forming, with a length higher than a given value, at the inlet of any Distribution Equipment during a start/stop transitional phase of the production. The regulation and control of the package flow allows a substantially constant distance to be achieved between individual of packs of sealed packages, so as to prevent them from crashing and package queues from forming, with a length higher than a given value, at the inlet of any Distribution Equipment during the continuous changes in the capacity of the Packaging Line during the discharge phase of the accumulator The Recipe Manager is a software application designed to automatically configure the Packaging Line to implement a Line Recipe selected by an operator via the Line Controller, during which the Filling Machine and a set of individual Distribution Equipments in the Packaging Line are identified to cooperate in producing packs of Packaged Consumer Products. In particular, the Filling Machine and each individual Distribution Equipment in the Packaging Line are configured to implement one or more selectable Equipment Recipes, which are stored in the corresponding Filling Machine and Distribution Equipments, and allow specific intermediate Packaged Consumer Products to be produced. More in detail, an Equipment Recipe for the Filling Machine defines the type of sealed packages to be produced by the Filling Machine, whereas an Equipment Recipe for a Distribution Equipment defines the operation(s) to be carried out by the Distribution Equipment on individual or packs of sealed packages.

Further in detail, a Line Recipe specifies the Packaging Line layout (package path), namely the Distribution Equipments and Conveyors to be involved in the production of the pack of Packaged Consumer Products, Equipment Recipes to be implemented by the Filling Machine and the involved Distribution Equipments, and Packaging Line automation parameters, namely the operating parameters to be used in the Packaging Line (conveyor speeds, photocell timing, control/command delays, Filling Machine and Distribution Equipment capacity) for controlling the package flow.

An Equipment Recipe instead specifies Recipe definition parameters, which identify the characteristics of individual or packs of sealed packages to be produced, or an operation to be carried out. For example, for a Cardboard Packer, these parameters may include the package pattern in the tray, and the typology of the tray, while for a Filling Machine, these parameters may include the volume and the shape of the package, the typology of opening device, etc.; and Recipe-dependent operating parameters, such as speed, temperature, pressure, etc., which are specific for the individual or packs of sealed packages or operations defined by the Recipe definition parameters.

The Conveyor Optimizer is the software application designed to optimize package transportation along the Packaging Line. In particular, the Conveyor Optimizer allows an operator to select and execute the following functions: Conveyor Settings, which allows the operator to set the operating parameters of each Conveyor in the Packaging Line other than those of the Filling Machine and the Distribution Equipment and directly controlled by the Line Controller, such as the Conveyor speed, the package width, the package distance, the Configuration Switch parameters, the accumulation function, etc.; and Lubrication and Cleaning, which allows the operator to operate a Conveyor lubricating and cleaning unit.

With reference again to FIG. 1, the Packaging System further includes a Packaging Line Monitoring System designed to cooperate with the Line Controller(s) to measure, analyze, and optimize the operational performance of each Packaging Line. In particular, in a Multi-Switch Packaging System with a single-tier control architecture, the Packaging Line Monitoring System is programmed to cooperate with the common Line Controller, while in a Multi-Switch Packaging System with a two-tier control architecture the Packaging Line Monitoring System is programmed to cooperate either with the master Line Controller, or with the slave Line Controllers, or with both the master Line Controller and the slave Line Controllers.

The Packaging Line Monitoring System is a data management system designed to monitor the operational performance of the Filling Machine(s) and the Distribution Equipments in the Packaging Line(s), and to maximise operational equipment performance based on plant floor data. The Packaging Line Monitoring System also provides powerful and easy-to-use tools to analyze operational equipment performance and process behaviour. Operational performance data are automatically captured and logged at the Packaging Line(s). Local manual input interaction makes data comprehensive. Information distribution to the factory office level allows real-time supervision and historical analysis. The Packaging Line Monitoring System allows optimum results to be achieved through the timely identification of downtime issues. The analysis of the production performance details identifies the critical performing equipment, and charts and reports are the tools to identify highest downtime reasons.

One of the main features provided by the Packaging Line Monitoring System is the package traceability and process monitoring function. Through a Graphical User Interface, one or more Operator Sheets may be provided which are the electronic replacement of the production paper handwritten documents. Data can be entered on operator demand or automatically requested by the system based on equipment events. Data entry is possible through manual input or using a barcode scanner. Data logged in the Operator Sheet(s) may for example be operator production checks, material used by the Packaging Line(s), such as packaging material, strips, caps, straws, etc., special production events such as batch id, batch start, batch stop, etc., operator IDs, locally-defined custom events, etc. Based on the data logged at the Filling Machine(s), the Packaging Line Monitoring System carries out a performance analysis and provides Operator Sheet Report(s). This allows monitoring of process parameters and critical control points during production. Process monitoring gives the possibility to execute advanced trouble shooting on machine process variables.

The Packaging Line Monitoring System also allows comprehensive package traceability to be achieved by time synchronization. In fact, the Packaging Line Monitoring System offers the possibility to synchronize the data logging time to a central time synchronization system, and the dating unit clock is synchronized locally by PLMS data logging system clock.

Figure 2:
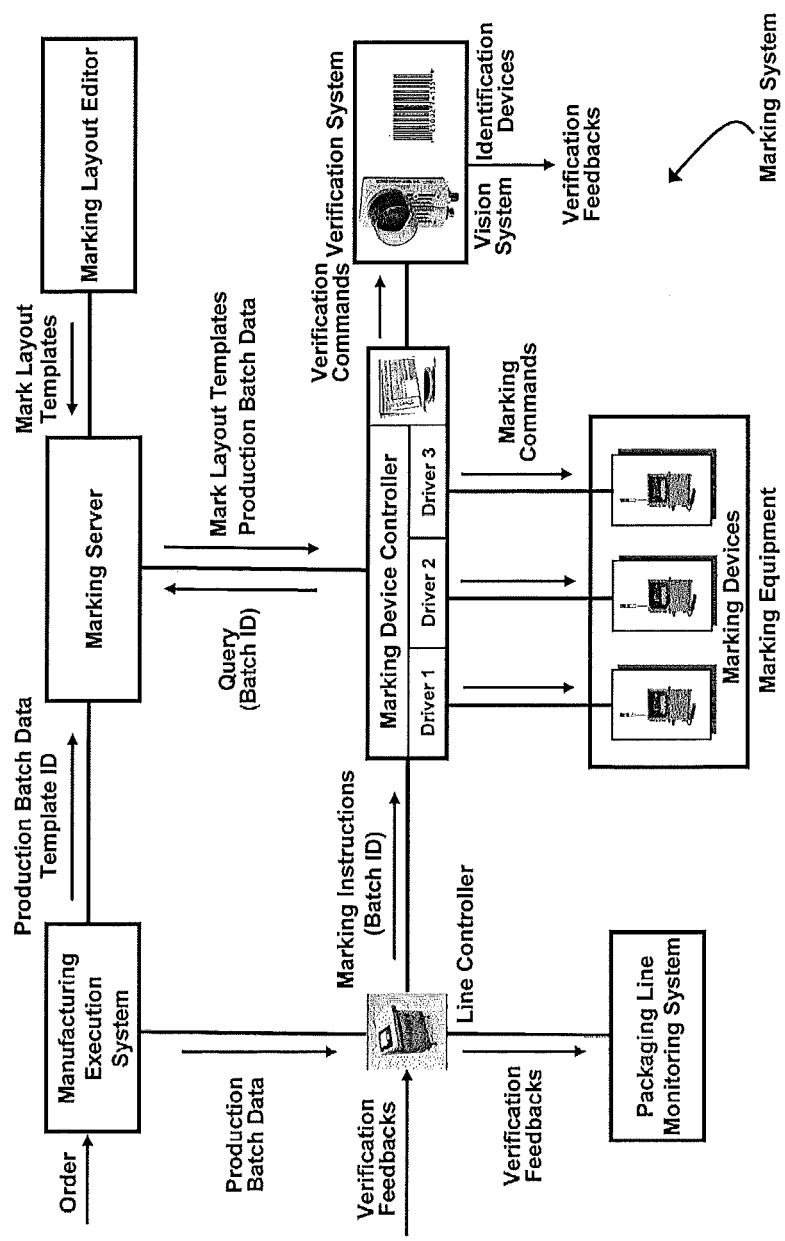
FIG. 2 shows a block diagram depicting an information flow relating to the marking of Packaged Consumer Products.

With reference to FIG. 2, the Packaging System further includes:
 a Marking System designed to apply graphical information, such as production and best-before dates, product description, batch IDs, (bar)codes, etc. onto individual or packs of Packaged Consumer Products produced by the Packaging Line(s); and
 a Verification System designed to verify whether graphical information actually applied onto the individual or packs of Packaged Consumer Products correspond to the one that the Marking System was instructed to apply, and including a Vision System, for example based on cameras, and/or one or more Identification Devices, for example (bar)code readers.

In particular, the Marking System comprises, for each Packaging Line in the Packaging System:
 a Marking Equipment comprising:
  one or more Marking Stations provided along the Packaging Line and each comprising one or more Marking Devices, such as inkjet and/or thermal transfer and/or laser Printers, operable to print graphical information onto individual or packs of Packaged Consumer Products in response to received Marking Command(s), and Labellers operable to print graphical information on blank labels and then apply printed labels onto individual or packs of Packaged Consumer Products in response to received Marking Command(s);
  one or more Marking Device Controllers designed to control the Marking Device(s) in the Marking Station(s) in response to received Marking Instructions; either a single Marking Device Controller may be provided for all the Marking Devices or a Marking Device Controller may be provided for the Marking Device(s) in each Marking Station;
 a Marking Layout Editor, which is an off-line software application/tool which allows Mark Layout Templates to be designed, each of which is an hardware-independent description of associated graphical information to be printed onto individual or packs of Packaged Consumer Products, and contains production-independent data, such as text, e.g. product descriptions, pictures, e.g. images, depictions, logos, (bar)codes, etc., and place holders, which will be valorized during marking of individual or packs of Packaged Consumer Products with production-dependent data, such as production and best-before dates, batch IDs, etc.; and
 a Marking Server comprising one or more Repositories designed to store Mark Layout Templates, along with associated Template Identifiers including, for example, the template names and versions; either a single, Common Repository may be provided to store all the Mark Layout Templates, or several, Distributed Repositories may be provided, each designed to store an associated group of Mark Layout Templates; the Marking Server being further designed to exchange data, with a Manufacturing Execution System of the Packaging System and with the Marking Device Controller(s) in the Marking Station(s), as will be described more in detail hereinafter.

FIG. 2 further shows with arrows the information flow relating to the marking of individual or packs of Packaged Consumer Products, for which a new production order is received.

As shown in FIG. 2, the Manufacturing Execution System is designed to perform the following tasks:
 Product Creation, during which the Manufacturing Execution System determines, via a software module referred to as Product Creator, the intermediate packaging products, materials and processes (Line Recipes stored in the Line Controller) requisite for producing the requested Packaged Consumer Product, which is the result of a combination of materials and working processes, and wherein the Mark Layout Template is one of the ingredients and is linked to the associated Packaged Consumer Product through the layout template name, which is manually inserted as a product property;
 Order Handling, during which the Manufacturing Execution System splits the production of the requested Packaged Consumer Product into production batches, each of which is identified by an associated unique identifier and is assigned to a Packaging Line for the production; and
 Production Dispatching, during which the Manufacturing Execution System communicates with the Line Controller(s) for production scheduling purposes, and with the Marking Server for marking purposes. In particular, during the Production Dispatching, the Manufacturing Execution System performs the following operations:
 downloading to a Line Controller in a Packaging Line and to the Marking Server, Production Batch Data representing a Production Batch assigned to a Packaging Line for production, and including:
 Generic Production Data, comprising:
  Production Batch Identifier (BatchID),
  Packaged Consumer Product Identifier (ProductID),
  Packaged Consumer Product Quantity; and Production Phase Data, comprising:
  Line Recipe Identifier (LCRecipeID), and
  Material Identifiers (MaterialID) of input/output materials to/from each Production Phase; and
  downloading to the Marking Server, Template Identifier(s) of the Mark Layout Template(s) to be used to mark individual or packs of Packaged Consumer Products produced during a Production Batch.

The Marking Server is designed to:
receive from the Manufacturing Execution System, Production Batch Data representing a Production Batch assigned to a Packaging Line for production, and associated Template Identifier(s) of Mark Layout Template(s) to be used to mark individual or packs of Packaged Consumer Products produced during the Production Batch assigned to the Packaging Line for production; wherein Production Batch Data includes a Production Batch Identifier, a Packaged Consumer Product Identifier, a Packaged Consumer Product Quantity and a Line Recipe Identifier;
receive from a Marking Device Controller a Query for stored Mark Layout Template(s) and Production Batch Data to be used to mark individual or packs of Packaged Consumer Products produced during the Production Batch assigned to a Packaging Line for production; wherein the Query includes a Production Batch Identifier; and
responsively provide a querying Marking Device Controller with the requested stored Mark Layout Template(s) and associated Production Batch Data, wherein a stored Mark Layout Template is identified and fetched out from a Repository in the Marking Server based on the association among the received Template Identifier, Production Batch Data and Production Batch Identifier.

A Line Controller is programmed to automatically configure a Marking Equipment in an associated Packaging Line in synchronism with the production, so as to cause graphical information from the Manufacturing Execution System to be printed on individual or packs of Packaged Consumer Products.

In particular, a Line Controller is programmed to:
receive from the Manufacturing Execution System Production Batch Data representing a Production Batch assigned to a Packaging Line for production;
cause a Line Recipe identified in received Production Batch Data to be implemented in an associated Packaging Line, so as to produce Packaged Consumer Products identified in the Production Batch Data in a quantity identified in the Production Batch Data; and
generate Marking Instruction(s) for associated Marking Device Controller(s), wherein a Marking Instruction for a Marking Device Controller includes a Production Batch Identifier of a Production Batch assigned to a Packaging Line and Marking Device Identifier(s), contained in the Line Recipe identified in the received Production Batch Data, identifying Marking Device(s) to be involved to mark individual or packs of Packaged Consumer Products produced during a Production Batch, in particular the Internet Protocol (IP) addresses of the involved Marking Device(s).

A Marking Device Controller is programmed to:
receive Marking Instructions from an associated Line Controller and a manually or automatically generated trigger signal indicating that production of a Production Batch is starting;
upon receiving a trigger signal, fetch out from a Repository in the Marking Server, Mark Layout Template(s) and Production Batch Data requisite to mark individual or packs of Packaged Consumer Products produced during a Production Batch assigned to the associated Packaging Line for production, which fetching out is carried out via an appropriate Query in the Marking Server based on a Production Batch Identifier in received Marking Instruction(s); and
generate Marking Command(s) for Marking Device(s) controlled by the Marking Device Controller based on fetched Mark Layout Template(s) and Production Batch Data, wherein a Marking Command for a Marking Device is designed to cause the Marking Device to mark individual or packs of Packaged Consumer Products with graphical information including production-independent data contained in a fetched Mark Layout Template and production-dependent data contained in fetched Batch Data, wherein the production-independent data and the production-dependent data are applied onto the individual or packs of Packaged Consumer Products according to the fetched Mark Layout Template.

A Marking Device Controller is further programmed to:
generate appropriate Verification Commands for the Verification System based on fetched Mark Layout Template(s) and Production Batch Data, wherein the Verification Commands are designed to cause, when executed, the Verification System to verify whether the graphical information actually applied onto the individual or packs of Packaged Consumer Products correspond to the one that the Marking System was instructed to apply, and in particular whether the graphical information includes the production-independent data and the production-dependent data printed on the individual or packs of sealed packages according to the associated Mark Layout Template(s); and
download to the Packaging Line Monitoring System Template Identifiers(s) of fetched Mark Layout Template(s) and Production Batch Data for traceability logging.

The Verification System is further designed to:
receive Verification Commands from a Marking Device Controller;
execute the received Verification Commands, thereby verifying whether graphical information applied onto the individual or packs of Packaged Consumer Products correspond to the one that the Marking System was instructed to apply; and
generate Verification Feedbacks for an associated Line Controller and, where appropriate, an associated Marking Device Controller, wherein the Verification Feedbacks are indicative of whether graphical information applied onto the individual or packs of Packaged Consumer Products corresponds to the one that the Marking System was instructed to apply.

A Line Controller is further designed to:
receive Verification Feedbacks from an associated Verification System;
stop operation of the associated Packaging Line when the graphical information applied onto the individual or packs of Packaged Consumer Products does not correspond to the one that the Marking System was instructed to apply; and
download to the Packaging Line Monitoring System received Verification Feedbacks for traceability logging. Alternatively, this operation could be performed by a Marking Device Controller designed to receive the Verification Feedbacks from the Verification System.

The invention claimed is:

1. A Packaging System (PS) comprising:
a Packaging Line (PL) designed to produce Packaged Consumer Products;
a Marking System (MS) designed to mark individual or packs of Packaged Consumer Products with graphical information; and
a Line Controller (LC) designed to control the Packaging Line and the Marking System and to store one or more selectable Line Recipes, each of which defines and, when implemented, causes corresponding Packaged Consumer Products to be produced by the Packaging Line;
wherein the Marking System includes:
a Marking Equipment (ME) comprising:
   one or more Marking Devices (MD) provided along the Packaging Line and designed to apply graphical information onto individual or packs of Packaged Consumer Products in response to one or more received Marking Commands; and
   one or more Marking Device Controllers (MDC) designed to control the one or more Marking Devices in response to received Marking Instructions; and
a Marking Server (MSE) comprising one or more Repositories designed to store one or more Mark Layout Templates, wherein a Mark Layout Template is a hardware-independent description of associated graphical information to be applied onto individual or packs of Packaged Consumer Products, and contains production-independent data, and place holders valorized to mark individual or packs of Packaged Consumer Products with production-dependent data;
wherein the Marking Server is designed to:
receive, from a Manufacturing Execution System, Production Batch Data representing a Production Batch assigned to the Packaging Line for production, and one or more associated Template Identifiers of the one or more Mark Layout Templates requisite to mark individual or packs of Packaged Consumer Products produced during the Production Batch; wherein Production Batch Data includes a Production Batch Identifier and a Line Recipe Identifier; and
provide, in response to a query including the Production Batch Identifier to the Marking Server, a Marking Device Controller with the one or more stored Mark Layout Templates and Production Batch Data requisite to mark individual or packs of Packaged Consumer Products produced during a Production Batch assigned to the Packaging Line;
wherein the Line Controller is designed to:
receive, from the Manufacturing Execution System, Production Batch Data representing a Production Batch assigned to the Packaging Line for production; and
generate the Marking Instructions for the one or more associated Marking Device Controllers, wherein a Marking Instruction for a Marking Device Controller includes the Production Batch Identifier of the Production Batch assigned to the Packaging Line for production, and one or more Marking Device Identifiers of the one or more Marking Devices to be involved to mark individual or packs of Packaged Consumer Products produced during a Production Batch, wherein the one or more Marking Device Identifiers are contained in the Line Recipe identified in the received Production Batch Data;

wherein a Marking Device Controller is designed to:
receive the Marking Instructions including the Production Batch Identifier from the Line Controller;
send the query including the Production Batch Identifier to the Marking Server, and receive from a Repository in the Marking Server the one or more stored Mark Layout Templates and Production Batch Data associated with the Production Batch Identifier requisite to mark individual or packs of Packaged Consumer Products produced during a Production Batch assigned to the Packaging Line for production; and
generate the Marking Commands for the one or more Marking Devices controlled by the Marking Device Controller based on the one or more received Mark Layout Templates and Production Batch Data, wherein a Marking Command for a Marking Device is designed to cause, when executed, the Marking Device to mark individual or packs of Packaged Consumer Products with graphical information including production-independent data contained in a received Mark Layout Template and production-dependent data contained in the received Batch Data, wherein the production-independent data and the production-dependent data are applied onto the individual or packs of Packaged Consumer Products according to the received Mark Layout Template.

2. The Packaging System of claim 1, wherein Production Batch Data further includes a Packaged Consumer Product Identifier and a Packaged Consumer Product Quantity;
and wherein the Line Controller is further designed to:
cause a Line Recipe identified in received Production Batch Data to be implemented in the Packaging Line, so as to cause Packaged Consumer Products identified in the Production Batch Data to be produced in the quantity identified in the Production Batch Data.

3. The Packaging System of claim 1, wherein a Marking Device Controller is designed to fetch out from a Repository of the Marking Server the one or more stored Mark Layout Templates and Production Batch Data requisite to mark individual or packs of Packaged Consumer Products produced during a Production Batch assigned to the Packaging Line for production by:
making a query in the Marking Server based on a Production Batch Identifier in the received Marking Instructions;
and wherein the Marking Server is designed to responsively provide a querying Marking Device Controller with the one or more stored Mark Layout Templates and Production Batch Data requisite to mark individual or packs of Packaged Consumer Products produced during a Production Batch assigned to the Packaging Line by:
fetching out from a Repository in the Marking Server the one or more stored Mark Layout Templates and Batch data based on the association among the one or more received Template Identifiers, the received Production Batch Data and the received Production Batch Identifier.

4. The Packaging System of claim 1, further including:
a Verification System (VS) designed to verify whether graphical information applied onto individual or packs of Packaged Consumer Products by the Marking System correspond to the one that the Marking System was instructed to apply.

5. The Packaging System of claim 4, wherein a Marking Device Controller is further designed to:

generate Verification Commands for the Verification System based on the one or more received Mark Layout Templates and Production Batch Data, wherein the Verification Commands are designed to cause, when executed, the Verification System to verify whether graphical information applied onto the individual or packs of Packaged Consumer Products correspond to the one that the Marking System was instructed to apply.

6. The Packaging System of claim 5, wherein the Verification System (VS) is further designed to:
receive Verification Commands from a Marking Device Controller;
execute the received Verification Commands, thereby verifying whether graphical information applied onto the individual or packs of Packaged Consumer Products correspond to the one that the Marking System was instructed to apply; and
generate Verification Feedbacks indicative of whether graphical information applied onto the individual or packs of Packaged Consumer Products corresponds to the one that the Marking System was instructed to apply.

7. The Packaging System of claim 6, wherein the Line Controller is further designed to:
receive Verification Feedbacks from the Verification System; and
stop operation of the Packaging Line when the graphical information applied onto the individual or packs of Packaged Consumer Products does not correspond to the one that the Marking System was instructed to apply.

8. The Packaging System of claim 4, wherein the Verification System includes at least one of a Vision System and one or more Identification Devices.

9. The Packaging System of claim 6, further including:
a Packaging Line Monitoring System (PLMS) designed to cooperate with the Line Controller to monitor at least one of the operational performance of the Packaging Line to allow real-time and historical performance analysis and to provide product traceability and process monitoring functionalities based on data logged in a Historical Database;
and wherein a Marking Device Controller is further designed to download to one or more Packaging Line Monitoring System Template Identifiers of the one or more received Mark Layout Templates and Production Batch Data for traceability logging.

10. The Packaging System of claim 9, wherein either the Line Controller or a Marking Device Controller is further designed to download to the Packaging Line Monitoring System Verification Feedbacks from the Verification System for traceability logging.

11. The Packaging System of claim 1, wherein the Packaging Line includes a Filling Machine (FM) and one or more downstream Distribution Equipment (DE); wherein the Filling Machine is operable to selectively produce one or different types of sealed packages containing one or different food products, and each Distribution Equipment is operable to carry out a corresponding operation on individual or packs of sealed packages; wherein the Filling Machine and each Distribution Equipment are operable to implement one or more selectable, stored Equipment Recipes, wherein an Equipment Recipe for the Filling Machine defines the type of sealed packages to be produced by the Filling Machine, and an Equipment Recipe for a Distribution Equipment defines the one or more operation to be carried out by the Distribution Equipment on individual or pack of sealed packages; and wherein a Line Recipe is designed to cause, when implemented, the Filling Machine and the Distribution Equipment involved in the production to implement corresponding Equipment Recipes.

12. A Marking System (MS) for use in a Packaging System (PS), as claimed in claim 1.

13. The Marking System (MS) of claim 12, further including a Verification System (VS) designed to verify whether graphical information applied onto individual or packs of Packaged Consumer Products by the Marking System correspond to the one that the Marking System was instructed to apply.

14. At least one processor configured with software modules associated with operations of a Line Controller, a Marking Server and a Marking Device Controller which cause, when executed, the Line Controller, the Marking Server and the Marking Device Controller to be implemented through the at least one processor according to claim 1.

* * * * *